(12) United States Patent
Ito et al.

(10) Patent No.: US 6,990,931 B2
(45) Date of Patent: Jan. 31, 2006

(54) HEAT STORAGE TANK IN COOLING WATER CIRCUIT

(75) Inventors: Shigeo Ito, Anjo (JP); Takashi Toyoshima, Obu (JP); Shigetaka Yoshikawa, Nishikamo-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/805,988

(22) Filed: Mar. 22, 2004

(65) Prior Publication Data
US 2004/0188533 A1    Sep. 30, 2004

(30) Foreign Application Priority Data
Mar. 31, 2003 (JP) .............................. 2003-093915

(51) Int. Cl.
*E02N 17/02* (2006.01)
(52) U.S. Cl. ................................. 123/41.14
(58) Field of Classification Search ............. 123/41.14, 123/41.01; 237/44, 75
See application file for complete search history.

(56) References Cited

U.S. PATENT DOCUMENTS

| | | | | |
|---|---|---|---|---|
| 2,016,179 A | * | 10/1935 | Rosenqvist | ............. 123/41.14 |
| 5,435,277 A | * | 7/1995 | Takahashi | ............ 123/142.5 E |
| 5,662,072 A | * | 9/1997 | Suzuki et al. | ............. 123/41.14 |
| 5,730,089 A | * | 3/1998 | Morikawa et al. | ........ 123/41.14 |
| 5,749,329 A | * | 5/1998 | Thurfjell | .................. 123/41.14 |
| 6,477,990 B2 | * | 11/2002 | Toyoshima et al. | ....... 123/41.14 |
| 6,532,911 B2 | * | 3/2003 | Suzuki et al. | ............. 123/41.14 |
| 6,718,925 B2 | * | 4/2004 | Toyoshima et al. | ... 123/142.5 R |
| 6,742,480 B2 | * | 6/2004 | Onimaru et al. | ......... 123/41.01 |

* cited by examiner

*Primary Examiner*—Henry C. Yuen
*Assistant Examiner*—Jason Benton
(74) *Attorney, Agent, or Firm*—Harness, Dickey & Pierce, PLC

(57) ABSTRACT

A heat storage tank includes a tank body having a cylindrical opening portion at one end side, and a coolant passage portion for defining therein flow passages communicating with the tank body. The tank body stores a coolant of a liquid-cooled engine therein while being thermal insulated, and the coolant flows into and flows out of the tank body through the flow passages. The coolant passage portion includes an insertion portion that is inserted into the opening portion in its axial direction. At least two O-rings are provided between the opening portion of the tank body and the insertion portion to seal a clearance therebetween, and are lined in the axial direction to be separated from each other in the axial direction by a predetermined distance. Accordingly, the heat storage tank can improve sealing performance of the coolant.

8 Claims, 3 Drawing Sheets

HEAT STORAGE TANK IN COOLING WATER CIRCUIT

CROSS-REFERENCE TO RELATED APPLICATION

This application is related to Japanese Patent Application No. 2003-93915 filed on Mar. 31, 2003, the content of which is hereby incorporated by reference.

BACKGROUND OF THE INVENTION

1. Field of the Invention

The present invention relates to a heat storage tank which stores a coolant of a liquid-cooled engine such as a water-cooled engine while being thermal-insulated.

2. Description of Related Art

For example, as disclosed in JP-A-2002-188442 (corresponding to U.S. Pat. No. 6,477,990), a heat storage tank is disposed in a cooling water circuit of a water-cooled engine, and stores high-temperature cooling water (coolant) therein in an engine operation. Then, the heat storage tank discharges the stored high-temperature cooling water to the engine at the next engine starting, thereby improving warming-up performance of the engine. Alternatively, heating performance of a heating unit can be improved using the cooling water (hot water) from the heat storage tank as a heat source.

The heat storage tank includes a tank body for storing high-temperature cooling water and a housing having a water passage communicating with the tank body. Further, the tank body and the housing are mechanically assembled to each other, so that cooling water in the water passage flows into and flows out of the tank body. Generally, an O-ring made of rubber is generally disposed between the tank body and the housing, so that a sealing performance can be obtained in the heat storage tank. However, in this case, the O-ring is exposed to both outside air and the high-temperature cooling water due to a vibration of a vehicle and a water pressure in the cooling water circuit. In this case, a rubber material readily deteriorates in high-temperature and oxidation conditions. Thus, the sealing performance of the cooling water in the heat storage tank may be deteriorated.

SUMMARY OF THE INVENTION

In view of the above problem, it is an object of the present invention to provide a heat storage tank which can effectively improve sealing performance of coolant therein.

According to the present invention, a heat storage tank for storing a coolant of a liquid-cooled engine includes a tank body in which the coolant is stored while being substantially thermal-insulated, and a coolant passage portion defining therein a flow passage communicating with the tank body, through which the coolant flows into and flows out of the tank body. The tank body has an inner wall surface for defining a cylindrical opening portion at one end side, and the coolant passage portion has an insertion portion that is inserted into the cylindrical opening portion in an axial direction of the cylindrical opening portion. In the heat storage tank, at least two O-rings, for sealing a clearance between the insertion portion and the inner wall surface defining the cylindrical opening portion, are disposed between an outer wall surface of the insertion portion and the inner wall surface defining the cylindrical opening portion of the tank body to be lined in the axial direction of the cylindrical opening portion.

Accordingly, the coolant can be basically sealed in the tank body by one of at least two O-rings. Thus, it can prevent air from being supplied to the one of the two O-rings by using the other one. Therefore, deterioration due to oxidation of the one of the O-rings is reduced, thereby improving sealing performance in the heat storage tank. Because the other one of the O-rings is not exposed to the coolant, deterioration due to a high temperature of the coolant is reduced. Thus, the other one of the O-rings can be readily selected in consideration of only oxidation resistance. Further, because the inner wall surface of the tank body defining the cylindrical opening portion and the insertion portion are supported with each other through the two O-rings, center axes of the tank body and the insertion portion can be automatically adjusted. As a result, the insertion portion can attached to the tank body while being prevented from being inclined in the cylindrical opening portion of the tank body.

Preferably, one of the insertion portion and the inner wall surface defining the cylindrical opening portion has two groove portions separated from each other in the axial direction, and the two O-rings are disposed in the two groove portions in parallel with each other to be separated from each other in the axial direction by a predetermined distance. In this case, the sealing performance of the O-rings can be more effectively improved.

For example, the two O-rings are first and second O-rings provided to be separately from each other in the axial direction. In this case, the first O-ring is disposed to directly seal a clearance communicating with an inner space of the tank body, and the second O-ring is disposed to prevent air from being supplied to the first O-ring. Thus, the first O-ring can be made of a first material having a high resistance to the coolant, and the second O-ring can be made of a second material having a high resistance to air, different from the first material. Therefore, the first and second material for the first and second O-rings can be readily selected. Further, it is possible to form the shape of the first O-ring to be equal to or to be different from that of the second O-ring.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
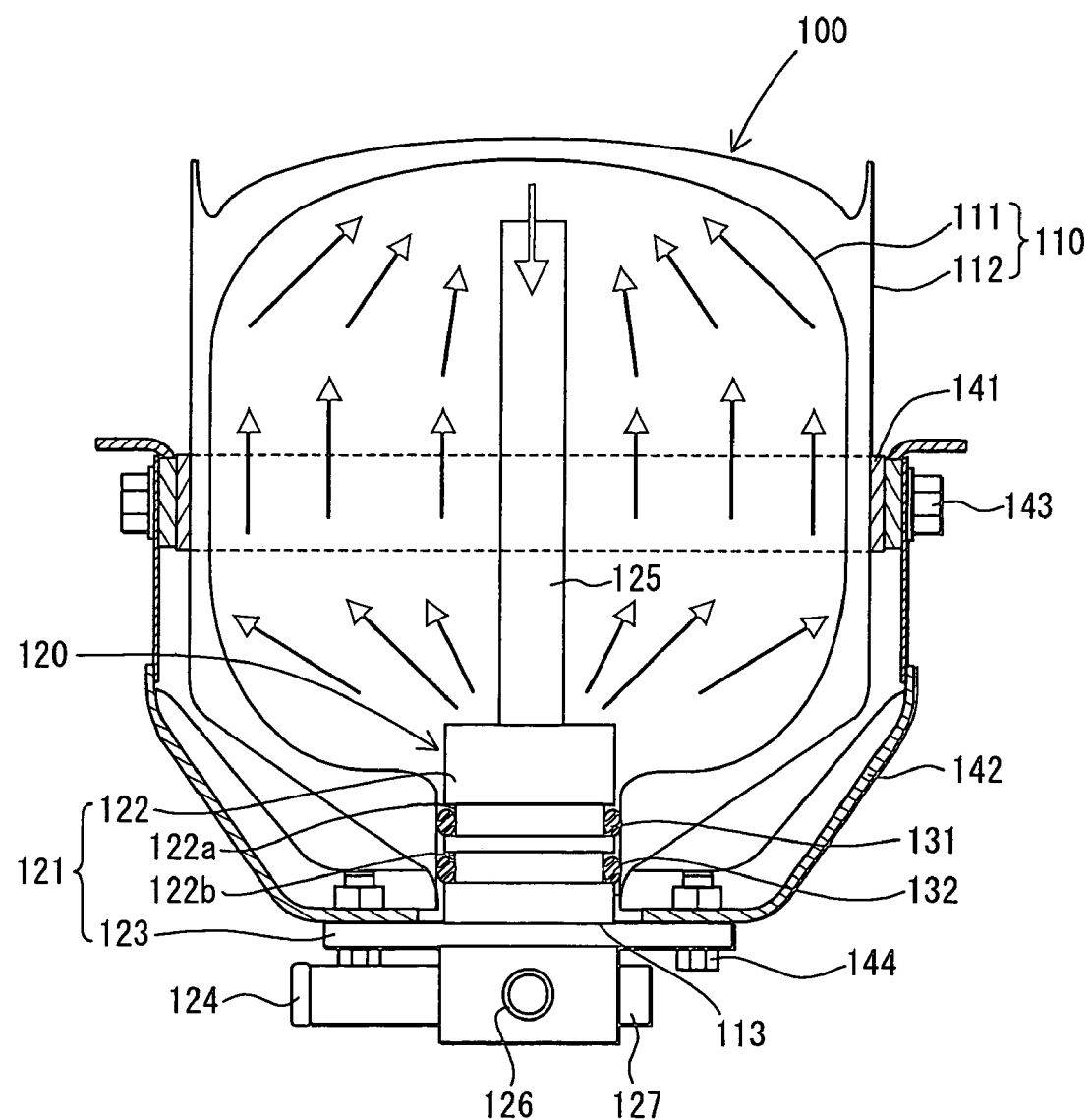
FIG. 1 is a schematic sectional view showing a heat storage tank according to a preferred embodiment of the present invention.

In this embodiment, a heat storage tank 100 according to the present invention is typically used for a cooling water (coolant) circuit of a water-cooled engine (liquid-cooled engine). As shown in FIG. 1, the heat storage tank 100 includes a tank body 110, and a cooling-water passage portion 120. The tank body 110 stores cooling water therein while performing a thermal insulation. The tank body 110 includes an inner tank portion 111 made of stainless steel having a high corrosion resistance, and an outer tank portion 112 provided to cover the inner tank portion 111. The inner and outer tank portions 111, 112 are connected together by welding or brazing while an approximate vacuum state is provided between the inner and outer tank portions 111, 112 so that a heat insulation layer is provided between the inner and outer tank portions 111, 112.

The tank body 110 has a cylindrical opening portion 113 at one end side (i.e., lower side in FIG. 1), and the cooling-water passage portion 120 is inserted into the opening portion 113 of the tank body 110. Specifically, the inner tank portion 111 includes a cylindrical inner wall surface for forming the opening portion 113, at a lower side in FIG. 1. A ring-shaped first bracket 141 is provided on an outer wall surface of the outer tank portion 112 of the tank body 110 at a center portion in a vertical direction, and a second bracket 142 extending toward the opening portion 113 is fixed to the first bracket 141 by using bolts 143. The outer tank portion 112 is attached to the first bracket 141, and an insertion portion 121 is attached to the second bracket 142. Thus, the outer tank portion 112 and the insertion portion 121 are attached to a vehicle body through the first and second brackets 141, 142. As a result, the inner tank portion 111 is attached to the vehicle body through two O-rings 131, 132 and the insertion portion 121. Here, the heat storage tank 100 has a structure where the inner tank portion 111 inclines and vibrates in the outer tank portion 112. However, a center axis of the opening portion 113 and a center axis of the insertion portion 121 are automatically aligned by the two O-rings 131, 132, thereby restricting the inner tank portion 111 from inclining and vibrating.

Figure 2:
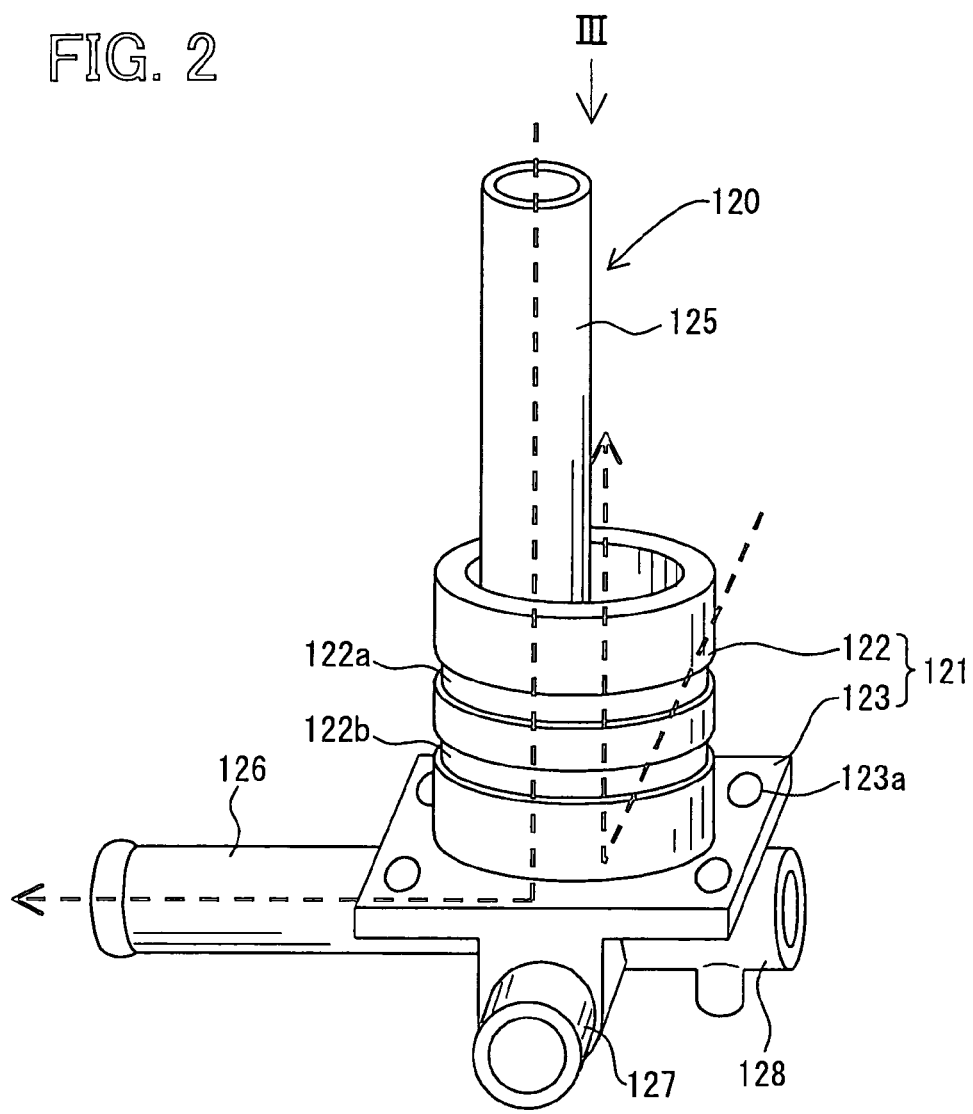
FIG. 2 is a perspective view showing a cooling-water passage portion in the heat storage tank according to the embodiment.
Figure 3:
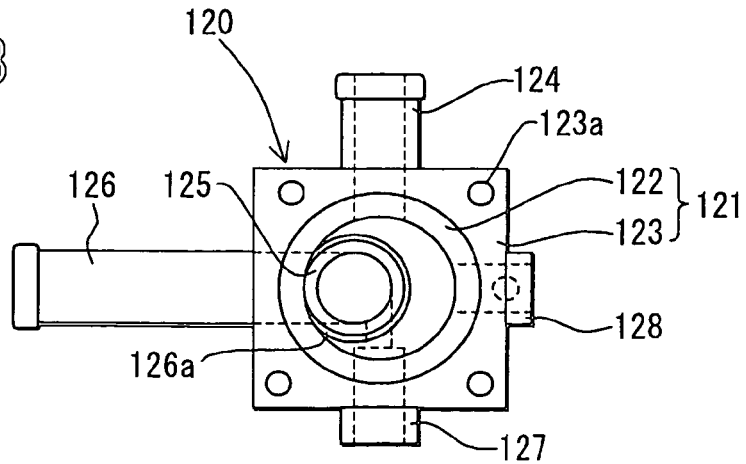
FIG. 3 is a top view when being viewed from the arrow III in FIG. 2.

As shown in FIGS. 2, 3, the cooling-water passage portion 120 includes a first flow passage (124, 122) through which cooling water flows into the tank body 110, and a second flow passage (125, 126) through which cooling water flows out of the tank body 110. The first and second flow passages (124, 122, 125, 126) are made of a nylon group resin, and components of the cooling-water passage portion 120 except a center pipe 125 among the components 121–128 are integrally formed by injection molding.

Specifically, the cooling-water passage portion 120 includes the insertion portion 121 constructed by a cylinder portion 122 and a rectangular plate portion 123. Further, the cooling-water passage portion 120 includes an inlet pipe 124, the center pipe 125 and an outlet pipe 126 used as the flow passages. O-ring grooves 122a, 122b are provided on an outer periphery of the cylinder portion 122 to be arranged in an axial direction of the cylinder portion 122 (in an up-down direction) and to be separated from each other in the axial direction. Therefore, the O-rings 131, 132 can be lined in the axial direction of the cylinder portion 122 to be separated from each other by a predetermined distance in the axial direction (vertical direction). Four attachment holes 123a are provided in the plate portion 123 around four corners, as shown in FIG. 3. The inlet pipe 124 and the outlet pipe 126 are disposed so as to form an angle of substantially 90 degrees, at an opposite side of the cylinder portion 122 with respect to the plate portion 123. The center pipe 125 is disposed inside the cylinder portion 122, and extends vertically to an upper side in the tank body 110. Further, the center pipe 125 is connected to an insertion portion provided in the outlet pipe 126, to communicate with the outlet pipe 126.

Figure 4:
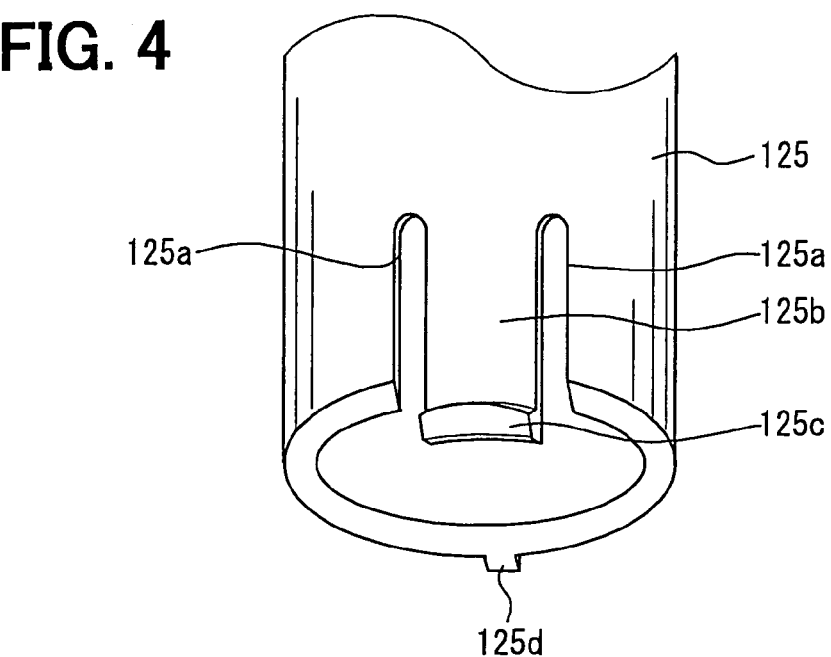
FIG. 4 is a perspective view showing an end portion of a center pipe of the cooling-water passage portion according to the embodiment.
Figure 5:
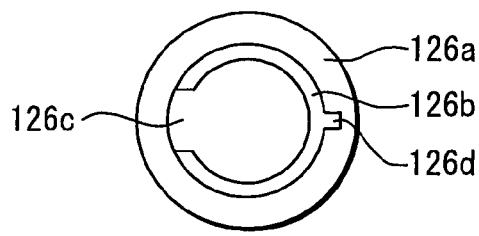
FIG. 5 is a plan view showing an insertion portion of an outlet pipe of the cooling-water passage portion according to the embodiment.
Figure 6:
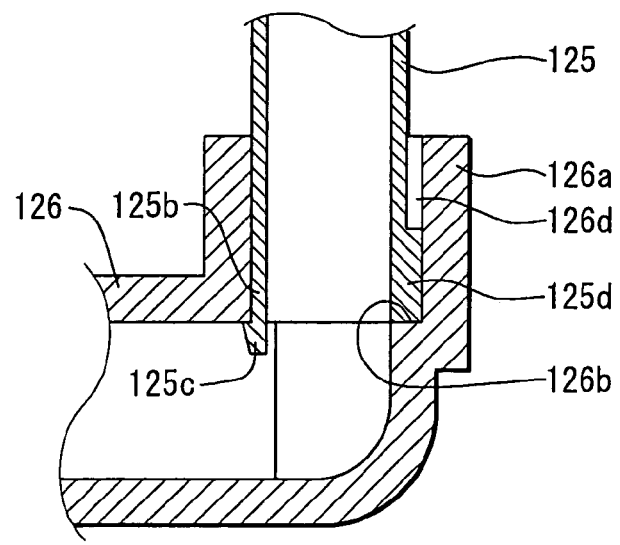
FIG. 6 is a cross-sectional view showing an attachment state between the center pipe and the insertion portion according to the embodiment.

The center pipe 125 is connected to the outlet pipe 126 by a connection structure shown in FIGS. 4–6. As shown in FIG. 4, the center pipe 125, formed as a separated member, has two slits 125a at its one end, and a projection 125c. The projection 125c protrudes outside in a radial direction of the center pipe 125, at a top end of a wall portion 125b formed between both slits 125a. The center pipe 125 includes a detent 125d (rotation stop portion), protruding outside in the radial direction and extending in a longitudinal direction of the center pipe 125, on its outer periphery at an opposite side of the projection 125c. In contrast, as shown in FIG. 5, a C-shaped seat surface 126b, a seat notch portion 126c and a detent insertion portion 126d are provided in the insertion portion 126a of the outlet pipe 126. The wall portion 125b of the center pipe 125 and the projection 125c thereof penetrate through the seat notch portion 126c, and the detent 125d of the center pipe 125 is fitted into the detent insertion portion 126d of the outlet pipe 126.

The center pipe 125 is inserted into the insertion portion 126a of the outlet pipe 126, while the wall portion 125b and the projection 125c are aligned with the seat notch portion 126c, and the detent 125d is aligned with the detent insertion portion 126d. At this time, the wall portion 125b of the center pipe 125 is inserted into the insertion portion 126a while being bent due to elasticity of a resin material thereof, and is engaged with an inside opening portion of the insertion portion 126a. In this way, the center pipe 125 is connected to the outlet pipe 126 in the insertion portion 126a by one step.

As shown in FIGS. 2, 3, a first attachment portion 127 for attaching a temperature sensor (not shown) and a second attachment portion 128 for attaching a drain cock (not shown) are provided on the plate portion 123 at the opposite side of the cylinder portion 122 with respect to the plate portion 123. As shown FIG. 3, the first attachment portion 127 is disposed at a side opposite to the inlet pipe 124, and the second attachment portion 128 is disposed at a side opposite to the outlet pipe 126. The first attachment portion 127 communicates with the outlet pipe 126, and the temperature sensor (not shown) is attached to the first attachment portion 127 to detect a temperature of cooling water flowing from the outlet pipe 126. The second attachment portion 128 communicates with the cylinder portion 122, and the drain cock (not shown) is attached to the second attachment portion 128.

As shown in FIG. 1, the O-rings 131, 132 are disposed in the O-ring grooves 122a, 122b of the cylinder portion 122, respectively, and the cylinder portion 122 of the insertion portion 121 is inserted into the opening portion 113 of the tank body 110, thereby forming the cooling-water passage portion 120. Here, the two O-rings 131, 132 can have the same specification (e.g., same size). A bolt 144 is inserted into each of the attachment holes 123a of the plate portion 123, and is fastened, so that the plate portion 123 is tightly attached to the second bracket 142. In this way, the tank body 110 and the cooling-water passage portion 120 are integrally assembled to each other, thereby forming the heat storage tank 100. The inlet pipe 124 is connected to a cooling-water outlet side in the cooling water circuit of the engine, and the outlet pipe 126 is connected to a cooling-water inlet side in the cooling water circuit of the engine.

Next, operational effects of the heat storage tank 100 in this embodiment will be now described. When a temperature of cooling water flowing from the engine increases higher than a predetermined temperature (e.g., 80° C.) after the water-cooled engine is sufficiently warmed up in an engine operation, a heat storage mode is performed. In the heat storage mode, high-temperature cooling water is stored in the tank body 110 of the heat storage tank 100. Specifically, cooling water flows into the tank body 110 through the inlet pipe 124 and the cylinder portion 122, and flows into the tank body 110 from the lower side to the upper side. Then, the cooling water flows into the center pipe 125 from its top end, and is returned to the water-cooled engine through the outlet pipe 126. In this way, high-temperature cooling water is stored in the tank body 110 due to this cooling water circulation. When the engine operation is stopped, the high-temperature cooling water is stored in the tank body 110, in a hot-water holding mode.

Then, when the engine operation is started, a warming-up mode is performed. That is, in the warming-up mode, high-temperature cooling water flows from the tank body 110 toward the engine, and the engine is rapidly warmed up. In the hot-water holding mode, heat is radiated from the high-temperature cooling water stored in the tank body 110. However, high-temperature cooling water is collected at the upper side in the tank body 110 due to natural convection. Therefore, in the warming-up mode, the high-temperature cooling water at the upper side in the tank body 110 flows toward the engine at first, thereby effectively increasing an engine warming-up effect. Here, when a temperature of cooling water flowing out of the tank body 110, detected by the temperature sensor, is determined to be lower than a predetermined temperature, the cooling water circulated in the engine is controlled to bypass the heat storage tank 100.

Cooling water in the inner tank portion 111 of the tank body 110 is directly sealed by the upper O-ring 131 provided on the cylinder portion 122, in the heat storage tank 100 including the tank body 110 and the cooling-water passage portion 120 attached together. Further, the lower O-ring 132 is provided at a lower side (outside) of the upper O-ring 131, so that the lower O-ring 132 prevents air from being supplied to the upper O-ring 131. Therefore, a deterioration of the upper O-ring 131 due to oxidation can be restricted, and sealing performance of the O-ring 131 can be improved. In contract, because the lower O-ring 132 is not exposed to cooling water by the upper O-ring 131, a deterioration of the lower O-ring 132 due to a cooling-water temperature can be restricted. Therefore, the O-ring 132 can be readily selected in consideration of deterioration of a rubber material due to only oxidation. In this embodiment, the O-ring grooves 122a, 122b are provided on the outer periphery of the cylinder portion 122 to be separated from each other by a predetermined distance in the axial direction. Therefore, the upper and lower O-rings 131, 132 can be readily separated from each other in the axial direction by a predetermined distance, and can be made to be parallel to each other.

Further, each inner side of the two O-rings 131, 132 contacts an outer wall surface of the insertion portion 121, and each outer side of the two O-rings 131, 132 contacts an inner wall surface of the inner tank portion 111, defining the opening portion 113. Therefore, the inner wall surface of the inner tank portion 111, defining the opening portion 113, and the insertion portion 121 (cylinder portion 122) are supported to each other through the two O-rings 131, 132. Thus, center axes of the opening portion 113 of the inner tank portions 111 and the insertion portion 121 can be automatically adjusted, and the insertion portion 121 can attached to the tank body 110 while being prevented from being inclined in the opening portion 113.

In the cooling-water passage portion 120, the center pipe 125 extending vertically by a large dimension is provided as a separated member, and is attached to the other component of the cooling-water passage portion 120. Therefore, injection molding dies are not required to be complicated and enlarged, and an injection molding temperature is not required to be strictly controlled, thereby readily constructing the cooling-water passage portion 120. Further, at least one of the temperature sensor and the drain cock are integrally provided with the cooling-water passage portion 120. Therefore, when the heat storage tank 100 is used for a warming-up system of a water-cooled engine, a space of the warming-up system and cost thereof can be reduced.

(Other Embodiments)

Although the present invention has been fully described in connection with the preferred embodiment thereof with reference to the accompanying drawings, it is to be noted that various changes and modifications will become apparent to those skilled in the art.

For example, in the embodiment, the O-rings 131, 132 have the same specification. However, the upper O-ring 131 is exposed to the cooling water in the inner tank portion 111. Therefore, the upper O-ring 131 can be made of a material having a high resistance to the cooling water. Further, because the lower O-ring 132 is exposed to outside air, the lower O-ring 132 can be made of a material having a high resistance to outside air. In addition, it is possible to set the shape of the O-ring 132 to be equal to or different from the shape of the O-ring 131. According to this manner, the sealing performance of the O-rings 131, 132 can be further improved.

Such changes and modifications are to be understood as being within the scope of the present invention as defined by the appended claims.

What is claimed is:

1. A heat storage tank for storing a coolant of a liquid-cooled engine, the heat storage tank comprising:
   a tank body in which the coolant is stored while being substantially thermal-insulated, the tank body having an inner wall surface for defining a cylindrical opening portion at one end side;
   a coolant passage portion having an insertion portion to be inserted into the cylindrical opening portion in an axial direction of the cylindrical opening portion, the coolant passage portion defining therein a flow passage communicating with the tank body, through which the coolant flows into and flows out of the tank body; and
   at least two O-rings for sealing a clearance between the insertion portion and the inner wall surface defining the cylindrical opening portion, the at least two O-rings being disposed between an outer wall surface of the insertion portion and the inner wall surface defining the cylindrical opening portion of the tank body to be lined in the axial direction of the cylindrical opening portion; wherein:
   the at least two O-rings comprise first and second O-rings provided to be separated from each other in the axial direction;
   the first O-ring is disposed to directly seal a clearance communicating with an inner space of the tank body; and
   the second O-ring is disposed to prevent air from being supplied to the first O-ring.

2. The heat storage tank according to claim 1, wherein:
one of the insertion portion and the inner wall surface defining the cylindrical opening portion has two groove portions separated from each other in the axial direction; and
the first and second O-rings are disposed in the two groove portions in parallel with each other to be separated from each other in the axial direction by a predetermined distance.

3. The heat storage tank according to claim 1, wherein:
the coolant passage portion is made of a resin material;
the coolant passage portion is constructed of a first portion at a predetermined position of the flow passage, and a second portion that is a residual part of the coolant passage portion except for the first portion; and
the first portion is attached to the second portion after the first portion is formed separately from the second portion.

4. The heat storage tank according to claim 1, further comprising at least any one of a temperature sensor for detecting a temperature of the coolant flowing out of the tank body, and a drain portion for draining the coolant stored in the tank body, wherein at least one of the temperature sensor and the drain portion is provided in the coolant passage portion.

5. The heat storage tank according to claim 1, wherein:
the first O-ring is made of a first material having a high resistance to the coolant; and
the second O-ring is made of a second material having a high resistance to air, the second material being different from the first material.

6. The heat storage tank according to claim 1, wherein the first and second O-rings contact the outer wall surface of the insertion portion and the inner wall surface of the tank body defining the cylindrical opening portion, to automatically adjust an axis of the insertion portion and an axis of the cylindrical opening portion in parallel with each other.

7. The heat storage tank according to claim 6, wherein:
the tank body includes an inner tank portion for storing the coolant therein and an outer tank portion covering the inner tank portion through a vacuum layer that is used as a heat insulation layer;
the inner tank portion has the inner wall surface defining the cylindrical opening portion; and
the first and second O-rings have outer peripheral surfaces tightly contacting the inner wall surface of the inner tank portion defining the cylindrical opening portion.

8. The heat storage tank according to claim 7, further comprising:
a first bracket to which the outer tank portion is attached; and
a second bracket to which the insertion portion is attached, wherein:
the outer tank portion and the insertion portion are attached to a vehicle body through the first and second brackets, respectively; and
the inner tank portion is fixed to the vehicle body through the first and second O-rings and the insertion portion.

* * * * *